United States Patent
Cheng

(10) Patent No.: US 10,222,769 B2
(45) Date of Patent: Mar. 5, 2019

(54) METHOD FOR DETERMINING AND TUNING PROCESS CHARACTERISTIC PARAMETERS USING A SIMULATION SYSTEM

(71) Applicant: EMERSON PROCESS MANAGEMENT POWER & WATER SOLUTIONS, INC., Pittsburgh, PA (US)

(72) Inventor: Xu Cheng, Pittsburgh, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 1171 days.

(21) Appl. No.: 13/650,296

(22) Filed: Oct. 12, 2012

(65) Prior Publication Data
US 2014/0107993 A1 Apr. 17, 2014

(51) Int. Cl.
G06F 17/10 (2006.01)
G06F 7/60 (2006.01)
(Continued)

(52) U.S. Cl.
CPC .................... *G05B 17/02* (2013.01)

(58) Field of Classification Search
CPC ............................ G05B 17/02; G06F 17/5009
(Continued)

(56) References Cited

U.S. PATENT DOCUMENTS 4,679,808 A 7/1987 Ito et al.
5,181,482 A * 1/1993 Labbe ................ F22B 37/56
122/379
(Continued)

FOREIGN PATENT DOCUMENTS

CN 1598720 A 3/2005
CN 101925866 A 12/2010
(Continued)

OTHER PUBLICATIONS

Ljung, Lennart, "System Identification Theory for the User: Second Edition," PTR Prentice Hall Information and System Sciences Series, Linkoping University, Sweden, 1999, cover, table of contents, pp. 203-205 and pp. 543-547; 17 pages total.

(Continued)

*Primary Examiner* — Andre Pierre Louis
(74) *Attorney, Agent, or Firm* — Marshall, Gerstein & Borun LLP

(57) ABSTRACT

A process characteristic parameter determination system uses a process model and a tuning module to accurately determine a value for a process characteristic parameter within a plant without measuring the process characteristic parameter directly, and may operate on-line or while the process is running to automatically determine a correct value of the process characteristic parameter at any time during on-going operation of the process. The process characteristic parameter value, which may be a heat transfer coefficient value for a heat exchanger, can then be used to enable the determination of a more accurate simulation result and/or to make other on-line process decisions, such as process control decisions, process operational mode decisions, process maintenance decisions such as implementing a soot blowing operation, etc.

36 Claims, 5 Drawing Sheets

(51) Int. Cl.
    *G06G 7/62* (2006.01)
    *G06F 17/50* (2006.01)
    *G05B 17/02* (2006.01)
(58) Field of Classification Search
    USPC .............................. 703/2, 13; 700/19, 29, 51
    See application file for complete search history.

(56) References Cited

U.S. PATENT DOCUMENTS

| | | | |
|---|---|---|---|
| 5,877,954 | A | 3/1999 | Klimasauskas et al. |
| 6,047,221 | A | 4/2000 | Piche et al. |
| 6,181,975 | B1 | 1/2001 | Gross et al. |
| 6,434,435 | B1 | 8/2002 | Tubel et al. |
| 6,941,287 | B1 | 9/2005 | Vaidyanathan et al. |
| 7,213,006 | B2 | 5/2007 | Hartman et al. |
| 7,451,122 | B2 | 11/2008 | Dietrich et al. |
| 8,019,701 | B2 | 9/2011 | Sayyar-Rodsari et al. |
| 8,560,283 | B2 | 10/2013 | Cheng et al. |
| 2002/0040250 | A1* | 4/2002 | Gaikwad ................ G05B 11/42 700/37 |
| 2003/0185100 | A1 | 10/2003 | D'Angelo et al. |
| 2005/0071035 | A1 | 3/2005 | Strang |
| 2006/0045801 | A1* | 3/2006 | Boyden ................ G05B 13/048 422/62 |
| 2006/0047564 | A1* | 3/2006 | Boyden ................ B01D 53/346 705/1.1 |
| 2007/0078529 | A1* | 4/2007 | Thiele ................ G05B 13/048 700/29 |
| 2007/0174808 | A1 | 7/2007 | Beale |
| 2007/0192063 | A1 | 8/2007 | Abu-El-Zeet et al. |
| 2008/0201054 | A1* | 8/2008 | Grichnik ................ B60W 40/00 701/102 |
| 2008/0288198 | A1* | 11/2008 | Francino ................ F01K 13/02 702/84 |
| 2010/0023464 | A1 | 1/2010 | Danai et al. |
| 2011/0131017 | A1 | 6/2011 | Cheng et al. |
| 2013/0146089 | A1* | 6/2013 | Radl ................ F22B 35/18 134/18 |

FOREIGN PATENT DOCUMENTS

| | | |
|---|---|---|
| EP | 1 705 542 A1 | 9/2006 |
| GB | 2 464 181 A | 4/2010 |
| JP | 2004-028948 A | 1/2004 |
| WO | WO-02/086640 A1 | 10/2002 |

OTHER PUBLICATIONS

Search Report, issued by the UK Patent Office dated Oct. 27, 2010 in connection with Great Britain Application No. GB1011185.4 (4 pages).
Search Report for Application No. GB1317611.0, dated Mar. 28, 2014.
First Office Action for CN Application No. 201310489427.8 dated May 3, 2017.
Second Office Action for CN Application No. 201310489427.8 dated Jan. 3, 2018.

\* cited by examiner

METHOD FOR DETERMINING AND TUNING PROCESS CHARACTERISTIC PARAMETERS USING A SIMULATION SYSTEM

TECHNICAL FIELD

The present disclosure relates generally to determining accurate process characteristic parameter values within power plants, industrial manufacturing plants, material processing plants and other types of plants and, more particularly, to determining process characteristic parameters using a tunable simulation system.

BACKGROUND

Generally speaking, processes used in power plants, industrial manufacturing plants, material processing plants and other types of plants include one or more controllers communicatively coupled to a plurality of field devices via analog, digital, combined analog/digital, or wireless communication channels or lines. The field devices, which may be, for example, valves, valve positioners, switches, transmitters (e.g., temperature, pressure, level and flow rate sensors), burners, heat exchangers, furnaces, boilers, turbines, etc., are located within the plant environment and perform process functions such as opening or closing valves, measuring process parameters, generating electricity, burning fuel, heating water, etc., in response to control signals developed and sent by the controllers. Smart field devices, such as the field devices conforming to any of the well-known Fieldbus protocols may also perform control calculations, alarming functions, and other functions commonly implemented within or by a plant controller. The plant controllers, which are also typically located within the plant environment, receive signals indicative of process measurements made by the field devices and/or other information pertaining to the field devices and execute a control application that runs, for example, different control modules which make process control decisions, generate process control signals based on the received information and coordinate with the control modules or blocks being performed in the field devices, such as HART® and FOUNDATION® Fieldbus field devices. The control modules within the controller send the process control signals over the communication lines or networks to the field devices to thereby control the operation of the process.

Information from the field devices and the controller is usually made available over a data highway to one or more other computer devices, such as operator workstations, personal computers, data historians, report generators, centralized databases, etc., typically placed in control rooms or at other locations away from the harsher plant environment. These computer devices may also run applications that may, for example, enable an operator to perform functions with respect to the process, such as changing settings of the process control routine, modifying the operation of the control modules within the controllers or the field devices, viewing the current state of the process, viewing alarms generated by field devices and controllers, implementing auxiliary processes, such as soot-blowing processes or other maintenance processes, keeping and updating a configuration database, etc.

As an example, the Ovation® control system, sold by Emerson Process Management, includes multiple applications stored within and executed by different devices located at diverse places within a process plant. A configuration application, which resides in one or more engineer/operator workstations, enables users to create or change process control modules and to download these process control modules via a data highway to dedicated distributed controllers. Typically, these control modules are made up of communicatively interconnected function blocks, which are objects in an object oriented programming protocol, which perform functions within the control scheme based on inputs thereto and provide outputs to other function blocks within the control scheme. The configuration application may also allow a designer to create or change operator interfaces which are used by a viewing application to display data to an operator and to enable the operator to change settings, such as set points, within the process control routine. Each of the dedicated controllers and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces. A data historian application is typically stored in and executed by a data historian device that collects and stores some or all of the data provided across the data highway while a configuration database application may execute in a still further computer attached to the data highway to store the current process control routine configuration and data associated therewith.

In many industries however, it is desirable or necessary to implement a simulation system for simulating the operation of a plant (including the various plant devices and the control network as connected within the plant) in order to perform better control of the plant, to understand how proposed control or maintenance actions would actually affect the plant, etc. Such a simulation system may be used to test the operation of the plant in response to new or different control variables, such as set-points, to test new control routines, to perform optimization, to perform training activities, etc. As a result, many different types of plant simulation systems have been proposed and used in process plants.

In the field of process plant simulation, process simulator design is typically based on either a first principle-based model or an empirical data-based model. A first principle-based model, also called a high-fidelity model, models equipment and processes based on first principle physical laws, such as well known mass, energy, and momentum conservation laws. First principle-based models describing a physical process are often complex and may be expressed using partial differential equations and/or differential algebraic equations. These equations may describe process or equipment properties and/or changes in those properties. In many first principle-based models, equations are modular which enables these equations to model specific pieces of equipment and/or processes in a multi-equipment or multi-process system. Thus, equipment and/or processes can be easily changed and/or updated in the model by replacing equations in the model with equations corresponding to the changed and/or updated equipment and/or processes. However, first principle-based models are subject to modeling errors due to the inability of first principle-based models to account for uncertainty surrounding the actual characteristics or properties of process equipment or of the process environment at any particular time. These process characteristics are, in many cases, simply estimated by a plant operator or are estimated using some other manual or off-line estimation technique.

On the other hand, empirical data-based models, also commonly called black-box models, generate modeling formulas or equations by applying test inputs to an actual process system in accordance with a designed experiment and then measuring test outputs corresponding to the test inputs. Based on the inputs and outputs, equations or other models that define a relationship between the inputs and outputs are generated to thereby create a model of the process or equipment. In this approach, the empirical equations may be easier to obtain than first principle-based equations, and dynamic transient phenomena may be better captured and represented in the empirical equations than in first principle-based equations. However, special experiments must be designed, implemented, and executed to acquire the accurate and diverse data sufficient to generate the empirical data used to develop the model. Moreover, the plant must typically be operated over some period of time in order to develop the model, which can be expensive and time consuming. Further, when equipment is changed or replaced, new empirical models must be developed, which can also be time consuming and costly. Still further, empirical models are unable to account for changes in the plant environment or for slow or gradual changes in the process plant equipment that result from aging or use of the plant equipment. In other words, while empirical based models are able to account for inherent process characteristics at the time of generation, these models are unable to be altered easily to account for changes in the process characteristics over time.

Thus, regardless of the type of process modeling approach used, a process simulation model often needs tuning and/or adjustment to be accurate enough for the purposes of the simulation in which the model is used. For example, in many cases, the created simulation models include factors related to unmeasurable process variables or characteristics (e.g., inherent properties of the process or the process equipment), referred to herein as process characteristic parameters, that change over time due to, for example, wearing of equipment, changes in the plant environment, etc. An example of one such process characteristic parameter is a heat transfer coefficient used to model heat exchangers within a plant, although there are many other such process characteristic parameters. In many cases, while these process characteristic parameters are unmeasurable as such in the plant, it is important to be able to determine these process characteristic parameters accurately, as the values of these process characteristic parameters not only affect the accuracy of the simulation, but may also be used to make decisions to perform other actions within the plant, such as control actions and maintenance actions.

As an example, many power plant processes (as well as other types of process applications) utilize heat exchangers that operate to transfer thermal energy from one fluid medium to another fluid medium as part of the power generation process. It is important for simulation and control purposes to determine how much energy is being transferred between the fluids at any particular time so that the equipment efficiency and the resulting temperature change can be accurately simulated, evaluated or understood, to thereby be able to determine appropriate control and/or maintenance actions. It is known that the heat transfer efficiency of heat exchangers and the resulting medium temperature changes within a heat exchanger are largely affected by the material properties of the heat exchanger (such as heat conductivity and heat capacitance of the heat exchanger), the heat exchanger surface area, the thickness of the heat exchanger tubes, the heat exchanger geometry, and various run-time conditions. Among these factors, material property, surface area, tube thickness, and configuration geometry can be considered to be design data from which a "design" heat transfer coefficient for a heat exchanger can be determined based on known mathematical principles. However, design information usually provides only a coarse approximation to the actual heat transfer coefficient of a particular heat exchanger being used in a plant at any particular time. The reason that the design heat transfer coefficient and the actual heat transfer coefficient of a heat exchanger as used in a plant differ is that the design data does not account for other, typically changing, factors present within a process plant that alter or affect the heat transfer coefficient, and thus affect or alter the heat exchanger efficiency during operation of the plant. In fact, the actual run-time environment typically includes many different factors that directly impact the "actual" heat transfer coefficient, which in turn affects the "actual" heat transfer efficiency and the "actual" final temperature of the fluid exiting the heat exchanger. For example, as the result of harsh coal combustion and fly-ash within a flue gas entering into a heat exchanger, soot builds up on or deposits on the surfaces of heat exchanger, and the heat transfer characteristics of this soot greatly affects the efficiency of and temperature changes produced within the heat exchanger. In addition, soot build-up and soot-blowing operations (that are implemented from time to time to remove the soot build-up within a heat exchanger) change the thickness of the tubes over time, which also affects the efficiency and temperature profile of the heat exchanger. Thus, the "actual" heat transfer coefficient for a heat exchanger used in process simulation and control needs to be adjusted or tuned to be different than the design heat transfer coefficient value for that heat exchanger to account for unmeasurable factors or phenomena present in the actual run-time situation.

To deal with this problem, it is common in current industry practice to tune and tweak the heat transfer coefficient in a heat exchanger model (which is usually a first principle-based model) using off-line calculations that are performed on historical data collected for the plant. However, calculating or determining the heat transfer coefficient in this manner results in a delay in updating the model, meaning that the model is still typically out of tune when used in real-time. Moreover, this delay may result in incorrect tuning, as the heat transfer coefficient may have changed between the collection of historical data and the running of the plant based on the heat transfer coefficient that was tuned or tweaked based on the historical data.

SUMMARY

A process characteristic parameter determination system accurately determines an actual process characteristic parameter value that exists within a plant without measuring the process characteristic parameter directly, and may operate on-line or while the process is running to automatically provide a current value of the process characteristic during on-going operation of the process. The process characteristic parameter value, as so determined, can then be used to enable the determination of a more accurate simulation result and/or to make other on-line process decisions, such as process control decisions, process maintenance decisions, process operational mode decisions, etc.

The process characteristic parameter determination unit includes a plant, equipment or process model, such as a first principle-based model, that includes or uses at least one process characteristic parameter to determine a predicted process variable output, and includes a tuning module that tunes or changes the value of the process characteristic parameter within the process model based on actual plant operation to thereby automatically adjust the value of the process characteristic parameter used in the process model to drive the predicted value of the process variable to match the measured or actual plant operation. This process characteristic parameter determination system thus automatically determines the values of one or more process characteristic parameters that make the output of the process model match or follow measured plant operation, leading to a quick and automatic determination of the process characteristic parameter during, for example, on-line operation of the plant. The process characteristic parameter values, as so determined or tuned, can then be used to perform better or more accurate simulation, and can also be used to perform other control or maintenance procedures. For example, when a heat transfer coefficient for a heat exchanger is determined using the process characteristic parameter determination system described herein, this heat transfer coefficient can be used to determine when to perform soot blowing or other maintenance procedures on the heat exchanger to thereby increase the efficiency of the plant operation, to reduce wear and tear on the heat exchanger caused by unnecessary soot blowing operations, etc. This heat transfer coefficient can also or instead be used to perform better or different types of control in a situation in which, for example, different types of control may be more suitable for controlling the process depending on the value or state of the process characteristic parameter. Still further, the determined process characteristic parameter may be used to decide whether or not to operate the plant or some portion of the plant at all, or to change the operational mode of the plant or some portion of the plant to thereby operate the plant more profitably, for example.

Still further, a simulation system and method defines or uses a process model, such as a first principle-based model, for modeling the operation of the plant or a relevant portion of the plant, such as a unit, a piece of equipment, a control system, etc. of the plant. The process model includes one or more variables indicative of a process characteristic parameter that is used in the modeling or that is used to determine or affect the output of the model. The process model is then operated along with the plant, and the simulation system and method compares an output of the process model with a measured or determined plant variable (which may be a measured process variable or a control signal) to determine a difference or error between the simulated or modeled process variable and the measured process variable value. The simulation system and method then use this difference in a tuning module to alter the value of the process characteristic parameter as used within the process model in a manner that drives the output of the process model to match the measured process variable value. In essence, the tuning module performs feedback compensation on the process characteristic parameter value to drive the model output of the process variable towards the measured process variable value. When the output of the process model matches or closely follows the measured process variable value, the simulation system and method may indicate that the value of the process characteristic parameter is correct, and may provide this process characteristic parameter value to a controller, a user interface system, or another simulation system for use in controlling the process, for display to the user, for simulating the process more accurately, etc. In addition, the process characteristic parameter value may be used (either manually or automatically) to make other decisions, such as control decisions, maintenance decisions (e.g., whether to implement a soot blowing operation on a heat exchanger), or business decisions (e.g., whether to continue to run or to stop running the plant in the current mode because it is no longer profitable to do so).

In effect, an automatic, on-line tuning method for a simulation system monitors the difference between a model predicted process variable value, such as a temperature profile of an output of a heat exchanger, and a measured process variable value of the process variable, e.g., a measured temperature of the output of the heat exchanger of the plant, in real-time. The tuning method utilizes a feedback controller which operates on this difference to gradually adjust the process characteristic parameter value, such as a heat transfer coefficient, of the process model used in the simulation system, until the modeled process variable value matches the actual or measured process variable value (e.g., the temperature as measured in the process). When these two variable values match, the process characteristic parameter value of the model (e.g., the modeled heat transfer coefficient) can be treated as accurate at that moment or for a short time period. Moreover, when the simulation and tuning procedure is carried out in real-time, the newly calculated process characteristic parameter value (e.g., the heat transfer coefficient) can be regarded as adaptively tracking the actual process characteristic parameter (e.g., the actual heat transfer coefficient of the plant). As a result, this scheme can assist in providing better control and maintenance procedures in plants, as this scheme accurately models or determines plant (e.g., equipment) characteristics that affect the need for control or maintenance operations.

DETAILED DESCRIPTION

Figure 1:
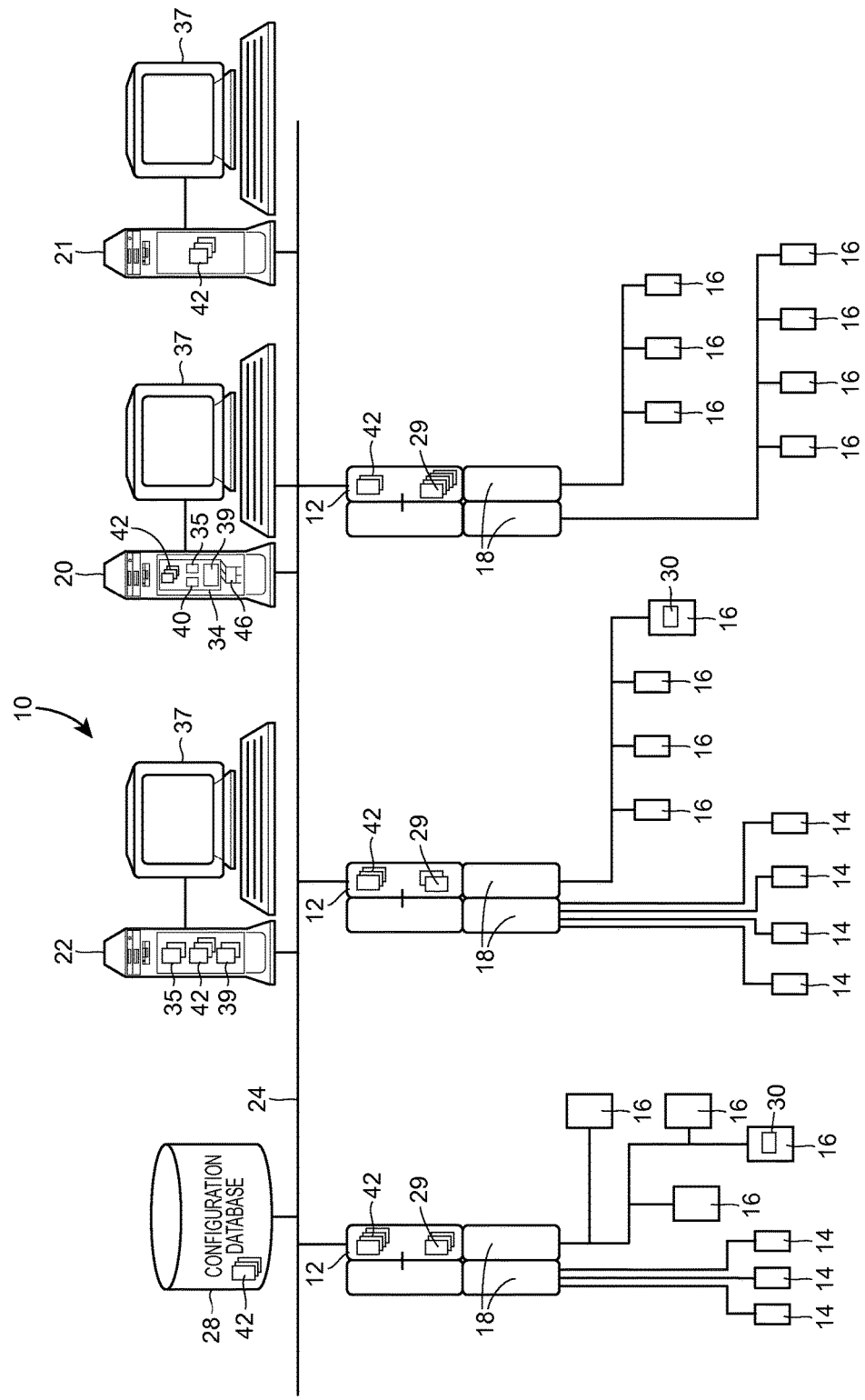
FIG. 1 is a block diagram of an example process plant and control network, such as that for a power plant, in which a simulation system can be implemented to compute or predict one or more process characteristic parameter values.

Referring now to FIG. 1, an example process plant and control network for a plant 10, such as that associated with a power generation plant, an industrial manufacturing plant, a chemical processing plant, etc., is illustrated at an abstract level of detail to illustrate a plant in which the process characteristic parameter determination unit and simulation system described herein can be implemented. The plant 10 includes a distributed control system having one or more controllers 12, each of which is connected to one or more field devices 14 and 16 via input/output (I/O) devices or cards 18 which may be, for example, Fieldbus interfaces, Profibus® interfaces, HART® interfaces, standard 4-20 ma interfaces, etc. The controllers 12 are also coupled to one or more host or engineer/operator workstations 20, 21 and 22 via a data highway 24 which may be, for example, an Ethernet link. A database 28 may be connected to the data highway 24 and operates as a data historian to collect and store parameter, process variable (including process variable measurements and control signals), status and other data associated with the controllers 12 and field devices 14, 16 within the plant 10. Additionally or alternatively, the database 28 may operate as a configuration database that stores the current configuration of the process control system within the plant 10 as downloaded to and stored within the controllers 12 and field devices 14 and 16. While the controllers 12, the I/O cards 18 and the field devices 14 and 16 are typically located down within and are distributed throughout the sometimes harsh plant environment, the engineer/operator workstations 20, 21 and 22 and the database 28 are usually located in control rooms or other less harsh environments easily assessable by controller or maintenance personnel.

As is known, each of the controllers 12, which may be by way of example, the Ovation® controller sold by Emerson Process Management Power and Water Solutions, Inc., stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may but need not be objects in an object oriented programming protocol, typically perform one of an input function, such as that associated with a transmitter, a sensor or other process parameter measurement device, a control function, such as that associated with a control routine that performs proportional-integral-derivative (PID), fuzzy logic, etc. control, or an output function that controls the operation of some device, such as a valve, to perform some physical function within the process plant 10. Of course hybrid and other types of complex function blocks exist such as model predictive controllers (MPCs), optimizers, etc.

In the plant 10 illustrated in FIG. 1, the field devices 14 and 16 connected to the controllers 12 may be standard 4-20 ma devices, may be smart field devices, such as HART®, Profibus®, or FOUNDATION® Fieldbus field devices, which include a processor and a memory, or may be any other desired type of field devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement one or more process control loops, as is well known. Of course, the field devices 14 and 16 may be any types of devices, such as sensors, valves, transmitters, positioners, etc., and the I/O devices 18 may be any types of I/O devices conforming to any desired communication or controller protocol such as HART®, Fieldbus, Profibus®, etc.

Still further, in a known manner, one or more of the workstations 20-22 may include user interface applications to enable a user, such as an operator, a configuration engineer, a maintenance person, etc., to interface with the process control network within the plant 10. In particular, the workstation 22 is illustrated as including a memory 34 which stores one or more user interface applications 35 which may be executed on a processor 46 within the workstation 22 to communicate with the database 28, the control modules 29 or other routines within the controllers 12 or I/O devices 18, with the field devices 14 and 16 and the modules 30 within these field devices, etc., to obtain information from the plant, such as information related to the ongoing state of the plant equipment or the control system. The user interface applications 35 may process and/or display this collected information on a display device 37 associated with one or more of the workstations 20-22. The collected, processed and/or displayed information may be, for example, process state information, alarms and alerts generated within the plant, maintenance data, etc. Likewise, one or more applications 39 may be stored in and executed in the workstations 20-22 to perform configuration activities such as creating or configuring the modules 29 and 30 to be executed within the plant, to perform control operator activities, such as changing set-points or other control variables, within the plant, etc., to perform maintenance applications or functions, such as running soot-blowers in the plant, initiating controller tuning within the plant, running valve or other equipment maintenance procedures, etc. Of course the number and type of routines 35 and 39 is not limited by the description provided herein and other numbers and types of process control and maintenance related routines may be stored in and implemented within the workstations 20-22 if desired.

The workstations 20-21, the database 28 and some of the controllers 12 of FIG. 1 are also illustrated as including components of a process characteristic parameter determination system and/or a simulation system that may be implemented in plant, such as that of FIG. 1. If desired, the process characteristic parameter determination system may be performed as part of or within a simulation system, which may be a centralized simulation system, in which case the simulation system components may be stored and executed in one of the operator workstations 20-22, for example, in a controller 12, in the data historian 28 or in any other computer or processing device within the plant 10 or in communication with the plant 10. On the other hand, the simulation system may be a distributed simulation system in which case simulation system components may be stored in various different ones of the devices associated with the plant 10, such as in the field devices 14, 16, the controllers 12, the user interfaces 20-22, the data historian 28, etc.

As one example, the workstation 20 is illustrated as including a set of simulation support applications 40, which may include a simulation configuration application, a user interface application and data structures for performing simulation of the process plant 10 using a process characteristic parameter determination unit in a manner described herein. Generally speaking, the simulation applications 40 enable a user to create, implement and view the results of a simulation executed by the various simulation components within the computer network system of FIG. 1. More particularly, a distributed simulation system may include various distributed simulation modules 42 that may be located in various different computing devices (also referred to as drops) on the computer network of FIG. 1. Each of the simulation modules 42 stores a model that is implemented to simulate the operation of an individual plant component or group of components, and the simulation modules 42 communicate directly with one another to implement a simulation of a larger portion of the plant 10. Any particular simulation module 42 may be used to simulate any portion or part of the plant 10, including a particular piece of plant equipment involved in processing or material flow, such as a tank, a heat exchanger, a controller, etc., or a group of equipment, such as a unit. Still further, the simulation modules 42 may be located in and executed in various different devices or drops on the computer network and may communicate via, for example, the communication bus 24, to send data between the simulation modules 42 so as to perform simulation of a larger group or set of plant equipment. Of course, any desired number of simulation modules 42 may be located in any particular drop and each drop may execute the simulation modules 42 therein independently of the other drops, so as to implement distributed simulation. However, if desired, all of the simulation modules 42 associated with any particular simulation may be stored in an executed by the same computer device (i.e., at a single drop) and still be implemented in the manner described herein.

The simulation applications 40 may be accessed by any authorized user (such as a configuration engineer, an operator or some other type of user) and may be used to create and configure a particular instance of a simulation system, by creating a set of simulation modules 42 and downloading these modules 42 to different drops within the plant or computer network. As illustrated in FIG. 1, various ones of the distributed simulation modules 42 may be downloaded to and implemented in the workstations 20-22, the controllers 12, the database 28 and/or any other computer device or processing device connected to the communication network 24. If desired, simulation modules 42 may be located and implemented in other processing devices that are indirectly connected to the network 24, such as in the field devices 16, in a business local area network (LAN) or even a wide area network (WAN) connected to one of the devices on the network 24. Still further, while the bus or network 24 is illustrated in FIG. 1 as the main communication network used to connect various drops that implement simulation modules, other types of communication networks could be used to connect drops, including any desired LANs, WANs, the internet, wireless networks, etc.

Once downloaded, the distributed simulation modules 42 execute individually but operate in conjunction with one another to perform simulation of the plant or components and equipment within the plant, as being controlled by the control blocks 29 and 30 as well as other controller routines executed within the controllers 12 and possibly the field devices 14, 16. Such a distributed simulation system may enable a user to perform different simulation and prediction activities with respect to the plant 10, via a user interface application in the suite of simulation applications 40. If desired, a distributed simulation system may simulate an operating plant or any portion thereof, such as that illustrated in FIG. 1, or may simulate a plant that has not actually been constructed. Importantly, as described in further detail herein, one or more of the simulation modules 42 may include or implement a process characteristic parameter determination unit or technique to accurately determine a current value of a process characteristic parameter that is used in the process model of that simulation module. The simulation modules 42 that include a process characteristic parameter determination unit or that implement a process characteristic parameter determination technique may provide the determined or current value of the process characteristic parameter to other simulation modules 42, to one or more of the user workstations 20-22, to one or more of the user interface applications 35, to one or more of the maintenance, control or configuration applications 39, or even to one or more of the controller applications 29 used to control the plant. These various different applications may receive and use the determined process characteristic parameters in any desired or useful manner, such as by displaying the current value of the process characteristic parameters to a user via a user interface application 35 to enable the user to take some maintenance, simulation or control action, by automatically taking control actions (e.g., tuning a controller, changing a mode of a controller, etc.) or maintenance actions (e.g., implementing one or more maintenance procedures, such as a soot blowing operation on a heat exchanger), or business actions (e.g., determining whether to continue to run or to stop running the plant in the current mode because it is no longer profitable to do so), etc.

Figure 2:
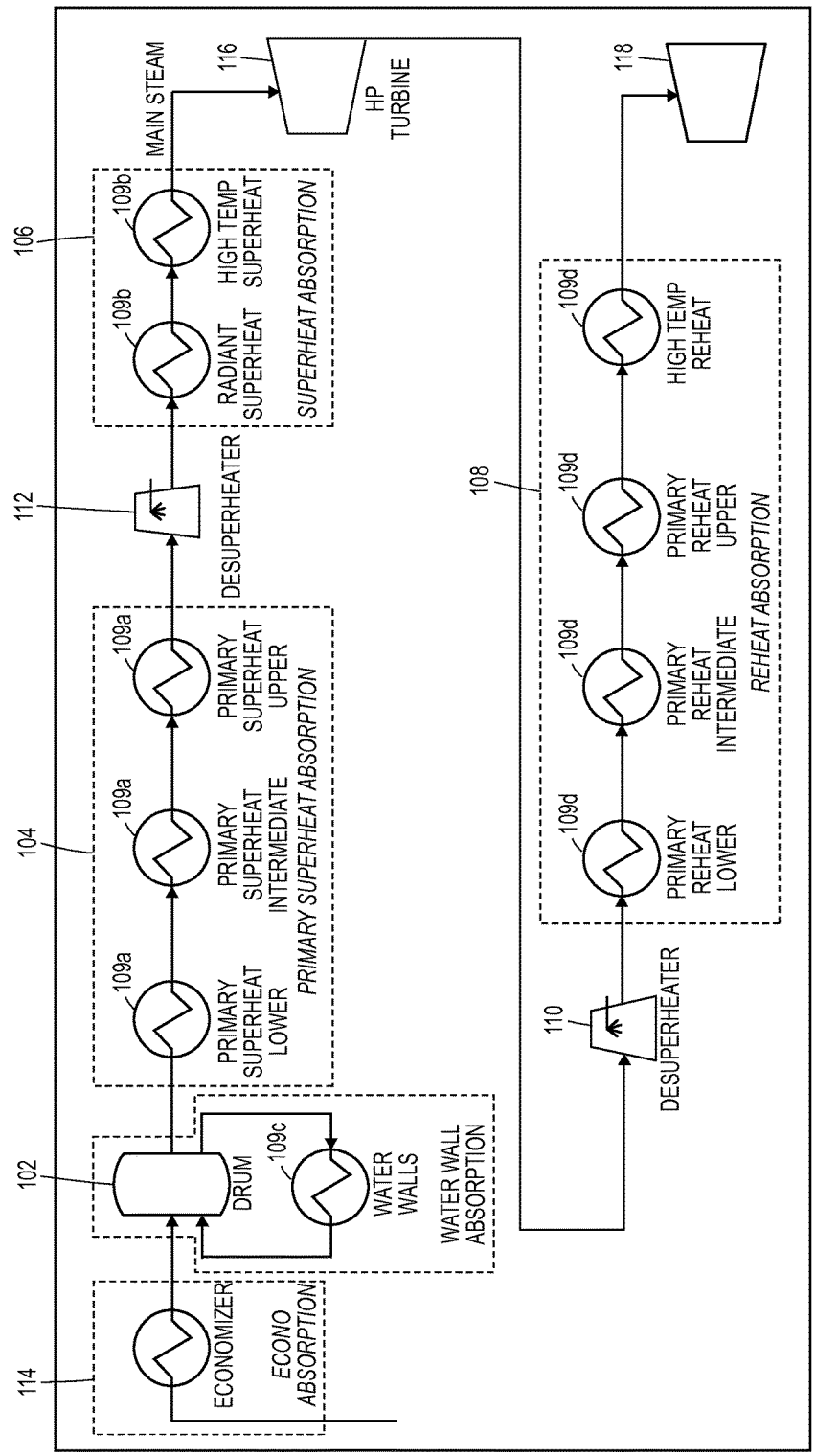
FIG. 2 is a block diagram of various components of a boiler steam cycle of a typical boiler based power plant that may be simulated using the simulation system implemented in the plant of FIG. 1.

As a more particular example of a plant in which a process characteristic determination unit can be used as part of a simulation system, FIG. 2 illustrates a block diagram of a boiler steam cycle for a typical boiler 100 that may be used, for example, by a thermal power generation plant which may be implemented using the process plant and control network of FIG. 1, for example. The boiler 100 includes various sections through which steam or water flows in various forms such as superheated steam, reheat steam, etc. While the boiler 100 illustrated in FIG. 2 has various boiler sections situated horizontally, in an actual implementation, one or more of these sections may be positioned vertically, especially because flue gases heating the steam in various boiler sections, such as a water wall absorption section, rise vertically.

In any event, the boiler 100 illustrated in FIG. 2 includes a water wall absorption section 102, a primary superheat absorption section 104, a superheat absorption section 106 and a reheat section 108 all of which include various heat exchangers 109a-109d. Additionally, the boiler 100 includes one or more de-superheaters 110 and 112 and an economizer section 114. The main steam generated by the boiler 100 is used to drive a high pressure (HP) turbine 116 and the hot reheat steam coming from the reheat section 108 is used to drive an intermediate pressure (IP) turbine 118. Typically, the boiler 100 may also be used to drive a low pressure (LP) turbine, which is not shown in FIG. 2.

The water wall absorption section 102, which is primarily responsible for generating steam, includes a number of pipes through which steam enters a drum. The feed water coming into the water wall absorption section 102 may be pumped through the economizer section 114. The feed water absorbs a large amount of heat when in the water wall absorption section 102. For example, in a typical drum-type boiler, the water wall absorption section 102 has a steam drum, which contains both water and steam, and the water level in the drum has to be carefully controlled. The steam collected at the top of the steam drum is fed to the primary superheat absorption section 104, and then to the superheat absorption section 106, which together raise the steam temperature to very high levels using various heat exchangers 109a and 109b. The water at the bottom of the drum is recirculated and heated further in one of the heat exchangers 109c. The main steam output from the superheat absorption section 106 drives the high pressure turbine 116 to generate electricity.

Once the main steam drives the HP turbine 116, the exhaust steam is routed to the reheat absorption section 108 where this steam is heated further in heat exchangers 109d, and the hot reheat steam output from the reheat absorption section 108 is used to drive the IP turbine 118. The desuperheaters 110 and 112 may be used to control the final steam temperature to be at desired set-points. Finally, the steam from the IP turbine 118 may be fed through an LP turbine (not shown here) to a steam condenser (not shown here), where the steam is condensed to a liquid form, and the cycle begins again with various boiler feed pumps pumping the feed water for the next cycle. The economizer section 114 is located in the flow of hot exhaust gases exiting from the boiler and uses the hot gases to transfer additional heat to the feed water before the feed water enters the water wall absorption section 102.

Figure 3:
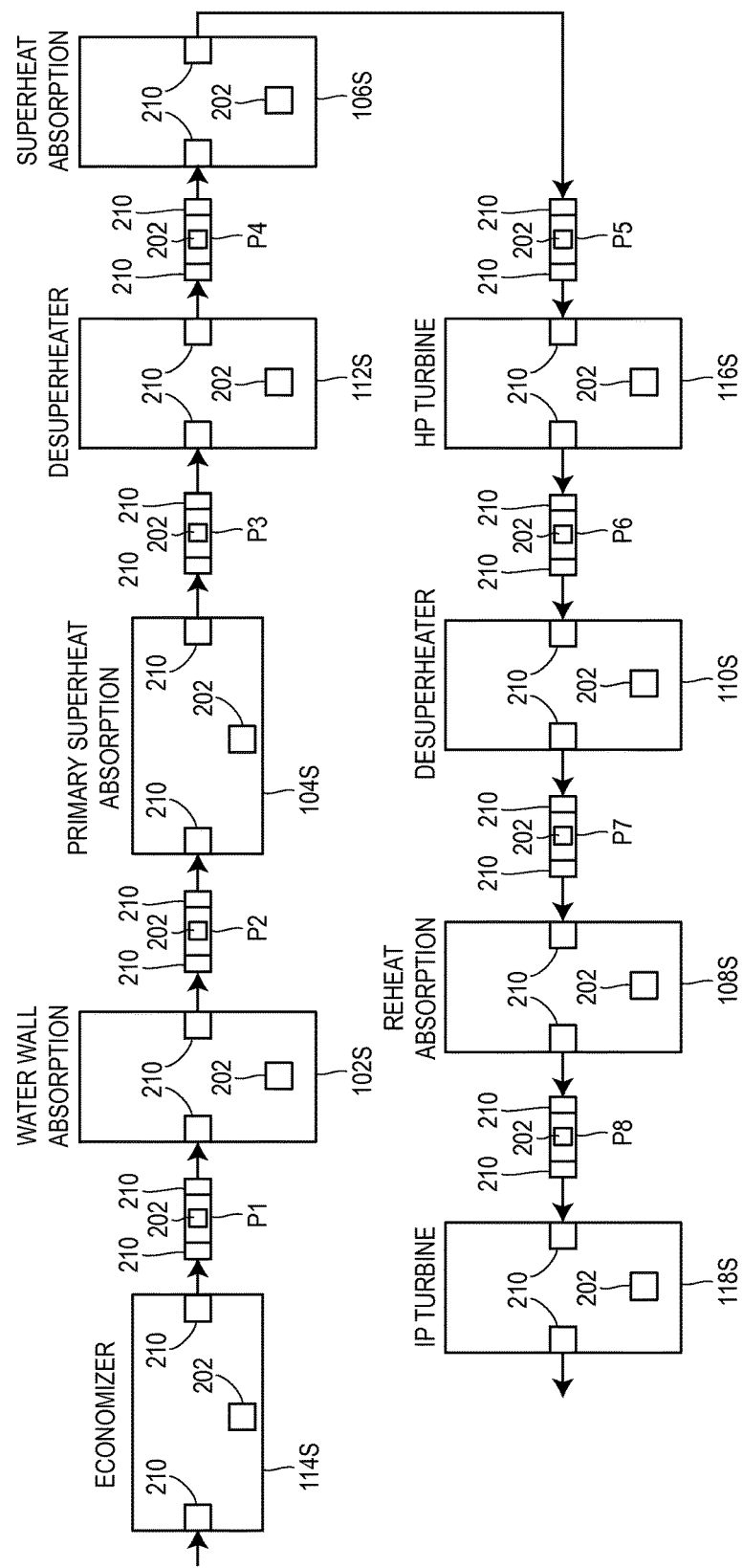
FIG. 3 is a block diagram of a set of simulation modules of a distributed simulation system configured to simulate the operation of the boiler steam cycle of the power plant of FIG. 2.

FIG. 3 illustrates a set of simulation modules 42 that may be used or implemented in a distributed manner to simulate the operation of the boiler steam cycle of FIG. 2. As will be understood, various of the simulation modules 42 may include or implement a process parameter characteristic determination unit or technique that determines a value for a process parameter characteristic within the plant. In particular, various of the simulation modules 42 of FIG. 3 may determine current or correct values for heat transfer coefficients for the various heat exchangers 109a-109d of FIG. 2.

As can be seen in FIG. 3, the distributed simulation modules 42 include separate simulation modules for each of the main plant elements depicted in FIG. 2 including a water wall absorption simulation module 102S, a primary superheat absorption simulation module 104S, a superheat absorption simulation module 106S, a reheat absorption simulation module 108S, desuperheater simulation modules 110S and 112S, an economizer simulation module 114S, and turbine simulation modules 116S and 118S. Of course, these simulation modules include plant element models, which may be in the form of first-principle equations, or any other desired types of models such as empirical models, which model the operation of these elements to produce simulated outputs for the corresponding plant equipment of FIG. 2 based on the inputs provided thereto. As will be understood, these process models include or use, in some manner, a process characteristic parameter, such as a heat transfer coefficient of one or more of the heat exchangers 109a-109d, to perform modeling of the relevant portion of the plant. While a separate simulation module is illustrated in FIG. 3 for each of the major plant components of FIG. 2, simulation modules could be made for sub-components of these the components of FIG. 2 or a single simulation module could be created combining multiple ones of the plant components of FIG. 2.

Thus, generally speaking, the distributed simulation technique and system illustrated in the example of FIG. 3 uses a number of separate simulation modules, wherein each simulation module models or represents a different active component in the process or plant being simulated (referred to herein as plant element simulation modules) or models. During operation, each simulation module may be executed separately, either in a common machine or processor or in separate machines or processors, to thereby enable parallel and distributed processing. Thus, for example, the different simulation modules of FIG. 3 can be executed in different and various ones of the workstations 20-22 of FIG. 1, the controllers 12 of FIG. 1, the field devices 16 of FIG. 1, the database 28 of FIG. 1, etc.

As indicated above, and as illustrated in FIG. 3, each of the simulation modules of FIG. 3 includes one or more executable models 202 for modeling the operation of an associated plant element or pipe and the simulation modules operate to implement these model(s) 202 to simulate operation of a plant element based on the inputs delivered to the plant element (in the form of fluids, solids, control signals, etc.) In most cases, the simulation modules will perform simulation based on an indication of an input (e.g., a fluid input, a gas input, a fluid pressure, temperature, etc.) from an upstream simulation module and will produce one or more output indications, indicating an output of the process or plant element (e.g., in the form of a fluid output, e.g., gas output, such as a fluid temperature, pressure, etc.) The models 202 used in the plant element simulation modules may be first principle models or any other suitable type of models for the particular piece of equipment being simulated. However, to implement the process characteristic parameter determination technique described herein, various of the simulation modules 102S to 118S may be tied to or receive process variable measurements (in the form of sensor measurements, process controller inputs and outputs, etc.) from the plant being simulated.

The distributed simulation system of FIG. 3 is also illustrated as including pipe simulation modules P1-P8 which are disposed between the plant element simulations modules described above. Generally speaking, the pipe simulation modules P1-P8, which can serve as simulation boundary modules, are responsible for modeling flow between the other simulation modules, providing feedback from downstream simulation modules to upstream simulation modules and implementing mass flow and momentum balancing equations to equalize the simulations performed by the different plant element simulation modules 102S-118S. The pipe simulation modules P1-P8 include models 202 for performing this flow modeling, e.g., that implement mass flow and momentum balancing routines to balance the mass flow, pressures, etc. between the different simulation modules 102S-118S. As also illustrated in FIG. 3, the various simulation modules 102S-118S and P1-P8 are connected via inputs and outputs 210. The specific operation of the distributed simulation system of FIG. 3 is provided in more detail in U.S. Patent Application Publication No. 2011/0131017 and in particular in the description of FIGS. 3-8 of that publication, the contents of which is hereby expressly incorporated by reference herein. However, in this case, one or more of the simulation modules 102S-118S or even the simulation modules P1-P8 include a process model that uses a process characteristic parameter to perform modeling or prediction and these simulation modules include a tuner that tunes this process characteristic parameter in a manner that forces the process characteristic parameter of the process model to match, equal or closely approximate the actual value of that process characteristic parameter within the actual process.

Figure 4:
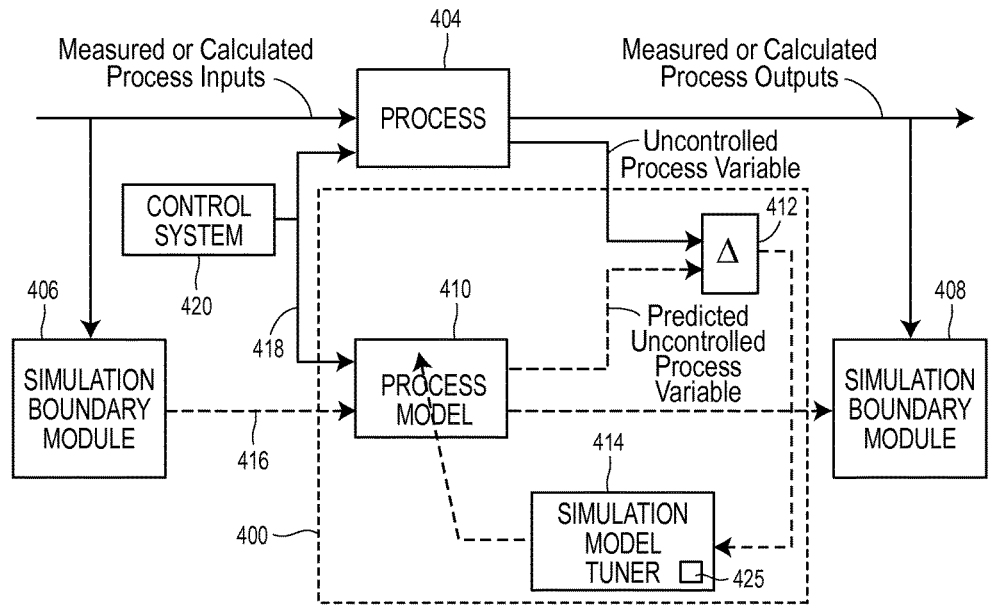
FIG. 4 is a block diagram of a first example simulation module of the simulation system of FIG. 3 as connected within a process, wherein the simulation module includes a process model and a tuning module that determines a correct value for a process characteristic parameter used within the process model based on plant operational conditions.

Referring now to FIG. 4, a process characteristic parameter determination unit is illustrated in the form of a simulation module 400 which is coupled to a process 404 and between an upstream simulation boundary module 406 and a downstream simulation boundary module 408. The simulation module 400 may be, for example, any of the simulation modules 102S-118S if so desired, while the boundary modules 406 and 408 may be any appropriate ones of the simulation modules P1-P8 of FIG. 3. However, these elements could be other types of simulations modules and boundary modules as well or instead. For clarity purposes, simulated or predicted signals or values generated by the simulation system are illustrated with dotted lines in FIGS. 4 and 5, while process control signals (e.g., signals or values determined within or measured by the process control system) are indicated with solid lines in FIGS. 4 and 5.

Generally speaking, the simulation module 400, which in this case is a part of a distributed simulation system, includes a process model 410, a difference unit or summer 412 and a simulation model tuner unit 414 which operate together to determine a value for a process characteristic parameter used by the process model 410. In this example, the process 404 may be an on-line process that is operating in real time and to which the simulation module 400 is connected via a communication channel or line. In this case, the simulation module 400 receives data (e.g., control signal data and measured process variable data) from the process 404 in real-time or as the process 404 is operating on-line and thus it may be beneficial to store and execute the simulation module 400 in the device that implements the process controller for the process 404 to reduce inter-device data communications within the simulation and control system of the plant. Alternatively, the process 404 may be an off-line process connected to the simulation module 400 via, for example, a data historian, such as the data historian 28 of FIG. 1. In this case, the simulation module 400 receives data collected from the process 404 in the past and stored in the data historian 28, and here it may be beneficial to store and execute the simulation module 400 in the data historian device to reduce data communications within the simulation and control system.

As indicated in FIG. 4, the process model 410 receives model inputs, via an input line or communication channel or connection 416, from the upstream simulation boundary module 406, which may be, for example, one of the other simulation modules of the distributed simulation system of FIG. 3, to which the simulation module 400 is communicatively connected. Still further, the process model 410 receives, via an input line or communication channel or connection 418, control signals output from a process controller 420 that operates as part of the process 404 to control the process 404 or elements within the process 404, such as valves, burners, fluid flows, etc. Generally speaking, the controller outputs (process control signals) provided at the input line 418 are received via or from the process controller 420 that controls or effects the portion of the process 404 (e.g., equipment within the process 404) being modeled by the process model 410. As will be understood, the process model 410 may be any type of process model, including a first principles-based model, or a black box or empirical-based model. For example, the process model may be based on or implement first principle mathematical equations as part of the modeling process (a first principle-based model) or may, for example, be a transfer function based model, a neural network model, a model predictive control (MPC) model, a regression model, a partial least squares (PLS) model, etc. (all examples of empirical-based models). In the example of FIG. 4, the process model 410 is the main or sole part of a process model unit within the simulation module 400. In any case, the process model 410 includes, in some form, one or more process characteristic parameters that are used as part of the process model 410 to perform modeling of the process 404. For example, a process characteristic parameter used in the process model 410 may be a heat transfer coefficient of a heat exchanger within the process 404 when, for example, the process model 410 models one or more of the heat exchangers 109a-109d in, for example, the boiler system of FIG. 2. In the case of an empirical-based model, such as a transfer function based model, the process characteristic parameter may be, for example, a gain of the model (which gain is considered to reflect a process characteristic).

As also illustrated in FIG. 4, the difference unit 412 (which may be a simple summing circuit or algorithm) includes two inputs and receives an output from the model 410 in the form of, for example, a predicted process variable value as developed by the process model 410 at one input and receives a measured process variable value (as measured within the process 404) for the same process variable being estimated by the process model 410 at another input. As will be understood, the process model 410 produces the prediction of the process variable based on the information from the control system 420, such as the process control signal being delivered to the process 404, based on information from the simulation boundary module 406, such as the flow rates and other upstream process variables needed by the process model 410 to operate to make a prediction of the process variable based on current process conditions, based on the internally stored process model and, in some cases, based on information from the simulation boundary module 408. The difference determination unit 412 determines a difference or error between the two inputs provided thereto, i.e., the measured process variable value from the process 404 and the predicted process variable value as produced by the process model 402, and provides the error signal to the simulation model tuner 414. As will be understood, the process variable that is measured within the process 404 and the process variable predicted by the process model 410 are related to the same process variable and, in the example in which the model 410 is modeling the operation of a heat exchanger, may be the temperature of the fluid at the output of the heat exchanger. Of course, the process variable value predicted by the model 410 and the process variable value as measured within the process 404 may be any other process variable including a control signal. In this example, it is assumed that the process variable value being predicted by the process model 410 and the process variable value measured in the process 404 is an uncontrolled process variable, that is, a process variable that is not being directly controlled by the control system 420 of the process 404. However, it may be possible to provide measured and predicted values of controlled process variables to the unit 412 as well.

The simulation model tuner 414 includes tuner logic 425 that operates to tune the value of the process characteristic parameter as used within the process model 410 in a manner that drives or causes the difference or error signal produced by the difference unit 412 to zero. In particular, the tuner logic 425 of the simulation model tuner 414 may alter the value of the process characteristic parameter (e.g., a heat transfer coefficient of a heat exchanger) as used within the process model 410 in order to cause the predicted process variable value output by the process model 410 to more accurately or closely match the actual measured process variable value from the process 404. Of course, the tuner logic 425 of the simulation model tuner 414 may alter or adjust the process characteristic parameter value within or used by the process model 410 in any known or desired manner, such as gradually, in fixed or variable steps or otherwise, and may do so based on a predetermined set of rules or a control routine stored within the simulation module tuner 414. Thus, for example, the tuner logic 425 of the simulation model tuner 414 may store rules indicating, for example, how best to modify the value of the process characteristic parameter in light of the error signal, and these rules may, for example, indicate that a positive error signal should cause the process characteristic parameter value to be altered in one direction, while a negative error signal should cause the process characteristic parameter value to be altered in the opposite direction. Additionally, the tuner logic 425 of the simulation model tuner 414 may include and use any kind of feedback control routine, such as a proportional, integral and/or derivative (PID) control routine, to determine the best manner for altering the process characteristic parameter in a manner that best drives the process model 410 over time to produce a predicted process variable value that matches or that is equal to the measured process variable value of process 404.

In any event, over time, by adaptively tuning or varying the process characteristic parameter value within the process model 410 to drive the predicted process variable output of the process model 410 to match the process variable value as measured within the process 404, the simulation model tuner 414 determines the actual value of the process characteristic parameter within the process 404. Thus when the simulation model tuner 414 actually gets the process characteristic parameter within the process model 410 to a value that causes the predicted process variable value at the output of the process model 410 to match the measured process variable from the process 404 for that same process variable, resulting in a zero or near-zero error signal output by the difference unit 412, the simulation model tuner 414 has in effect determined the actual value of the process characteristic parameter that is present in, exists in or is associated with the current state of the process 404.

As illustrated in FIG. 4, the simulation module 400 may provide the current value of the process characteristic parameter as well as other needed or pertinent model parameters or outputs, such as fluid flows, temperatures, pressures, etc. to the downstream simulation boundary module 408 for use in the next or downstream simulation element via a communication channel, line or other connection. However, the simulation module 400 may also or instead provide the current value of the process characteristic parameter to any other simulation module or to any other application or user within the process plant 10 of, for example, FIG. 1, for use in these other applications in any desired manner via one or more communication channels, connections or lines associated with the process control network.

Of course, while the process characteristic parameter value determination unit described in FIG. 4 is illustrated as being part of a distributed simulation module 400 which is an element within a distributed simulation system, this process parameter characteristic determination unit may be used as a stand-alone unit to determine any particular process characteristic. Moreover, the process characteristic parameter determination unit described herein with respect to FIG. 4 could also be part of a centralized simulation system in which simulation is performed for a large portion of the plant or process, or for the entire plant or process at a single location. Thus, the process characteristic determination unit used in the simulation module 400 may be implemented as part of a centralized simulation system instead of being part of a distributed simulation system as illustrated in FIG. 4.

The process 404 is indicated in FIG. 4 to be an online and operating process, and thus in this case the process characteristic parameter value determination unit determines the process characteristic parameter value on-line, that is, during on-line or on-going or real-time operation process 404. However, the process characteristic parameter determination unit may also be communicatively coupled to the process 404 via a data historian, such as the data historian 28 of FIG. 1 to receive previously collected data for the process 404 to thereby operate off-line to determine the process characteristic parameter for the process 404 at a time associated with the actual measured values of the process 404 stored in the historian 28. That is, the process determination characteristic unit may be operated in real-time and during on-going operation of the process 404 for real-time determination of the process characteristic parameter value, but may also be implemented off-line or be implemented based on historical or previously collected and stored process variable data in the form of measured process variables and control system inputs and outputs, as well as other data necessary for operation of the process model 410.

Figure 5:
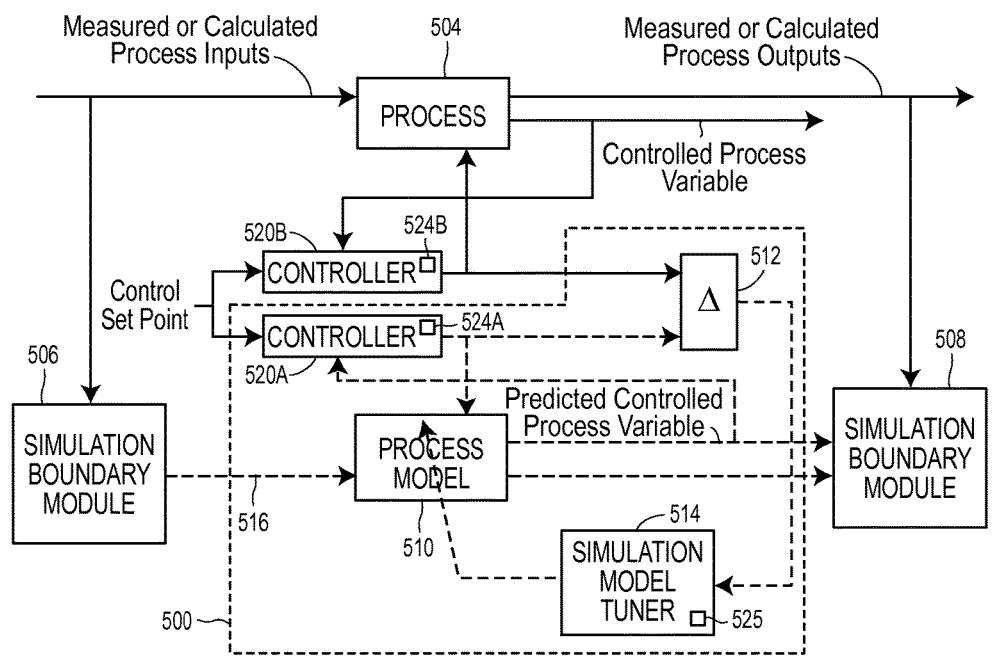
FIG. 5 is a block diagram of a second example simulation module of the simulation system of FIG. 3 as connected within a process, wherein the simulation module includes a process model and a tuning module that determines a correct value for a process characteristic parameter used within the process model based on plant operational conditions.

FIG. 5 illustrates another embodiment of a process characteristic parameter determination unit, again illustrated as part of a simulation module 500, which in this case may be used to determine process characteristic parameter values based on measured or controlled process variables. As illustrated in FIG. 5, the simulation module 500 is connected to a process 504 and between an upstream simulation boundary module 506 and a downstream simulation boundary module 508. The simulation module 500 includes a process model unit that includes a process model 510, which may be similar to the process model 410 of FIG. 4 and the simulation module 500 includes a difference unit 512 and a simulation model tuner 514 which operate similar to the units 412 and 414 of FIG. 4, respectively. Again the upstream simulation boundary model 506 provides the process model 510, via an input line or communication connection 516 with the necessary information for the process model 510 to operate including, for example, simulated flows, materials, temperatures, pressures, settings, etc., as determined by or used by upstream simulation modules. Similarly, such information is sometimes also provided by the downstream simulation boundary module 508.

However, as illustrated in FIG. 5, instead of receiving a control system output from the process 504 and predicting, from this control system output, a predicted value of an uncontrolled process variable (as performed by the simulation module 400 of FIG. 4), the process model 510 produces an estimate or estimated value of a controlled process variable and provides this predicted process variable value to a simulated controller 520A (which may be part of the process model 510 or part of the process model unit of the simulation module 500). More particularly, the process model unit of the simulation module 500 includes a simulated controller 520A which receives a controller set point for the controlled process variable from the process control system of the process 504 and receives a predicted value of the controlled process variable as developed by the process model 510. The simulated controller 520A operates to simulate the control actions or activities performed by an actual process controller 520B that is used to control the process 504 using the same set point value for the controlled process variable. Of course, the simulated controller 520A includes controller logic 524A that operates in the same manner as actual controller logic 524B of the process controller 520B, that is, using the same logic, tuning factors, gains, settings, etc., because the purpose of the simulation controller 520A is to simulate the operation of the actual controller 520B during operation of the process 504 based on the predicted value of controlled process variable (as output by the process model 510) instead of the actual or measured value of the controlled process variable.

As illustrated in FIG. 5, the predicted or simulated control signal values developed by the simulated process controller 520A are also provided back to the process model 510 which uses these control signal values to produce the estimated value of the controlled process variable. Moreover, the actual process controller 520B also receives the control set point and a measurement of the controlled process variable from the process 504 as a feedback input and uses these signals to perform control of the process in any desired or known manner. Thus, as will be understood, the actual controller 520B and the simulated controller 520A use the same control parameters and control techniques to perform control and to thus produce a control signal (that is, an actual control signal or a simulated control signal) based on the actual measurement of the controlled process variable from the process 504 or based on the predicted value of the controlled process variable from the process model 510. Of course, the actual process controller 520B produces an actual control signal provided to the plant or process 504, while the simulated process controller 520A produces a simulated control signal, which is provided back to the process model 510 to enable process model 510 to produce the predicted value of the controlled process variable as an output.

As illustrated in FIG. 5, the control signals output from both the actual process controller 520B and the simulated process controller 520A are provided as inputs to two inputs of the difference unit 512, which produces an error signal indicating the difference between the outputs (process control signal values) of the controllers 520A and 520B. This difference or error signal is then provided to the simulation model tuner 514, which, similar to simulation model tuner 414 of FIG. 4, uses tuner logic 525 to alter or vary the value of the process characteristic parameter within the model 510 in an attempt to drive the output of the simulated controller 520A to meet or match the output of the actual process controller 520B. The tuner logic 525 of the simulation model tuner 514 may operate in a similar manner as that described with respect to the tuner 414 of FIG. 4 and thus can operate in any desired manner to alter or change the value of the process characteristic parameter within the process model 510. Of course, when the simulation model tuner 514 causes the output of the simulated process controller 520A to be equal to or close to the output of the actual process controller 520B, the difference unit 512 produces a zero or near-zero value, which indicates that the process characteristic parameter value of the model 510 is at the real or actual value as it exists within the process 504. In this case, of course, the predicted value of the controlled process variable output by the model 510 should be equal or nearly equal to the value of the actual measured and controlled process variable within the process 504 as, ideally, the controllers 520A and 520B operate the same on these values to produce the same control signals (actual and simulated) being delivered to the difference detection unit 512.

Similar to the system of FIG. 4, the process model 510 (or the simulation module 500 as a whole) may provide its outputs, including flows, temperatures, etc., as well as, if desired, the current value of the process characteristic parameter to the downstream simulation boundary module 508, which is downstream of the simulation element or module 500 implementing the process parameter characteristic determination unit, via any desired communication channel or connection. Thus, as will be understood, the system of FIG. 4 enables a process characteristic parameter value to be determined using measurements of an uncontrolled process variable and a prediction value of an uncontrolled process variable as produced by a process model 410, while the system of FIG. 5 enables a process characteristic parameter value to be determined using measurements of a controlled process variable and a prediction value of a controlled process variable as produced by a process model 510. In the second case, the control signals output by the process controller 520B (as measured or determined within the process 504) and as produced by the simulation process controller 520A are compared to one another to determine whether the process characteristic parameter within the process model is set to the correct or actual value associated with that characteristic of the actual process. Of course, in all or most other manners, the elements of FIG. 5 are the same or similar to those of the corresponding elements of FIG. 4.

Figure 6:
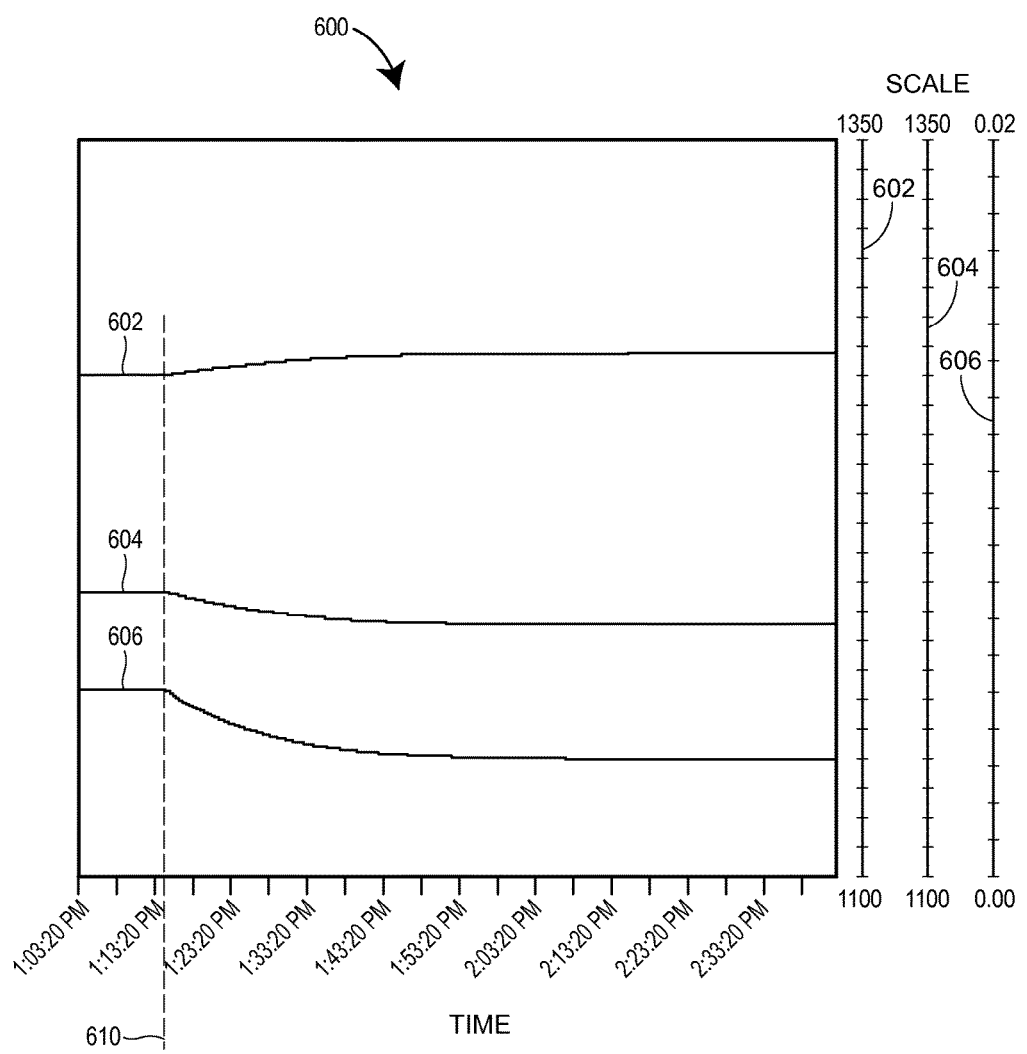
FIG. 6 is a graph illustrating an example operation of the simulation module of FIG. 4.

FIG. 6 depicts a graph 600 illustrating a simulated example of the operation of the process characteristic parameter determination system of FIG. 4 when used to determine a heat transfer coefficient of a heat exchanger in which flue gas produced in a boiler system of a power plant was provided as an input to the heat exchanger to create or to heat steam delivered to the output of the heat exchanger, wherein the steam was used to drive one or more turbines of the power plant. More particularly, a super-heater section of a boiler was selected for this proto-type demonstration. The graph 600 of FIG. 6 includes an upper line 602 that illustrates the simulated hot flue gas temperature output from the heat exchanger over time, a middle line 604 that illustrates the relatively cold simulated steam temperature at the output of the heat exchanger over time (based on the temperature profile of the flue gas entering into the heat exchanger) and a lower line 606 that indicates the simulated heat transfer coefficient between heat exchanger metal and steam as determined by the system of FIG. 4 when used to model the operation of the heat exchanger.

This example shows that, at the beginning, the simulated flue gas outlet temperature was at 1269.9 F, the simulated steam outlet temperature was at 1195.9 F, and the simulated super-heater heat transfer coefficient (from metal to steam) was at 0.005. However, the actual steam temperature from measurement was 1185F. Thereafter, the simulation model tuner 414 was turned on and, as indicated in the line 606, the heat transfer coefficient was gradually adjusted by the tuner 414 to a final value 0.0031, while the simulated steam temperature finally settled at 1185F.

More particularly, at the time 610 indicated by the dotted line in FIG. 6, the process characteristic parameter determination system was turned on and the model tuner 414 thereof started adapting the heat transfer coefficient within a model of the heat exchanger (i.e., a first principle-based model in this case) based on a difference between the measured steam temperature and a predicted value of this steam temperature (the line 604) as produced by a process model when the flue gas in the heat exchanger matched the temperature profile of the line 602.

As illustrated in FIG. 6, over a time period of approximately 50 to 60 minutes, the simulation model tuner 414 adapted the heat transfer coefficient (the line 606) as used within the process model of the heat exchanger in a manner that drove the steam temperature as predicted by the process model (the line 604) to be equal to or near equal to the measured steam temperature. Moreover, the simulation system was able to do so even though the input flue gas and the measured steam temperature in the plant were changing over time. Note that, as indicated in FIG. 6, it took a relatively short period of time for the heat transfer coefficient, as used in the process model, to reach steady state, at which this coefficient reflected the actual heat transfer coefficient of the heat exchanger within the process. Moreover, the simulation system was able to continue to develop an accurate and up-to-date value for the heat transfer coefficient during on-going or on-line (or simulated on-line) operation of the process. Thus, in this case, as can be seen from FIG. 6, after approximately 20 to 30 minutes, the heat transfer coefficient of the heat exchanger (the line 606) was determined pretty accurately and changed very little, thereby indicating that the heat transfer coefficient as determined by the simulation model tuner 414 matched the actual value of this process characteristic within the process and thus accurately represented the conditions within the process.

Of course, while the example of FIG. 6 is illustrated as determining a value of a process characteristic parameter in the form of a heat transfer coefficient of a heat exchanger using an uncontrolled process variable in the form of a measured and predicted steam temperature at the output of a heat exchanger, this and other process characteristic parameters could be determined using these or other process variables.

Still further, the selection of process variables for use in the process characteristic parameter determination unit or simulation unit for a heat exchanger may include, but is not limited to, measured or calculated process inputs in the form of heat exchanger inlet steam temperature, pressure, and flow and heat exchanger inlet flue gas temperature, pressure, and flow; measured or calculated process outputs in the form of heat exchanger outlet steam pressure and flow and heat exchanger outlet flue gas pressure and flow; and matched variables in the form of steam temperature or flue gas temperature. In these systems of course, the process controllers could be any types of controller including any control algorithm used in a distributed control system (DCS), and the simulation model tuner may use any type of control routine for varying the process characteristic parameter including, for example, any feedback-type stabilizing control routine or technique, such as a PID control technique. However, the system described herein is not limited to the use with or to the determination of heat transfer coefficients in heat exchangers.

Moreover, as noted above, the systems 400 and 500 of FIGS. 4 and 5 can be used in on-line or in off-line operations. When used in on-line operations, the simulation (or process characteristic parameter value determination) occurs contemporaneously with the process operation, and thus the simulation system immediately receives the process variable measurements and process control signals needed to perform simulation and tuning. However, due to the communication load and amount of data typically required to perform the simulation, it is desirable if the simulation unit (or the process characteristic determination unit) is stored in and is executed on a processor of a device near or within the plant at which this data is immediately available, such as within a process controller performing control of the process or the equipment being modeled, a field device performing control or performing measurements of process variables being used in the simulation etc., in order to reduce communication overhead within the process control system or plant communication network.

When used in an off-line simulation system, the simulation components or module can first collect process data in the form of inputs necessary for the process model (such as process controller inputs and outputs, process variable measurements of the process variable to be predicted, and any other data needed from the process for performing simulation) and may store this data in a database, such as the data historian 28 of FIG. 1. The simulation unit or the process characteristic parameter determination unit may then apply the simulation and model tuning techniques above using the stored data in the database, as if this data were being received in real-time. Of course, in this case, the simulation system is not limited to operating in the same time frame as the time frame in which the data is collected and, instead, could operate faster or slower than real time to adaptively change the value of the process characteristic parameter within the process model so as to cause the process model output to match the actual measured process output. Moreover, in an off-line situation, in which the data is pre-stored, the simulation model tuner may actually adapt the process characteristic parameter to a correct value at any particular time by determining, for a single time, the value of the process characteristic parameter that causes the predicted value of the process variable and the measured value of the process variable to match. In this case, the process model and tuner unit may operate multiple times for a single time period or segment if so desired so as to drive the difference between the predicted process variable value and the actual process variable value to be zero or near zero.

Of course, the process characteristic parameter, as produced by and used within the process model 410 or 510 may be provided to a user or some other application within, for example, the user interface devices 20-22 of FIG. 1 to enable a user or operator to take some action based on these determined values or to enable a user to make further decisions or choices within the plant. For example, the operator may take or implement a control action or a maintenance action based on the determined value of the process characteristic parameter. The operator may, for example, implement control tuning via a controller application, a maintenance procedure such as a soot-blowing procedure via a maintenance application, etc., based on the determined value of the process characteristic parameter. Still further, a control, maintenance or other system may compare the determined process characteristic parameter to a threshold and, based on that determination, may automatically take some action within the plant, such as setting or generating an alarm or an alert to be displayed or sent to a user, automatically initiating a control or maintenance procedure, etc. For example, in the situation in which the process characteristic parameter is a heat transfer coefficient of a heat exchanger, when the heat transfer coefficient becomes too low (falls below a predetermined threshold), a user may manually or the system may automatically implement a maintenance or control procedure (such as a soot blowing or controller tuning) to increase the heat transfer coefficient or to compensate for the low heat transfer coefficient in the control of the process. Of course, these are just a few examples of the further actions that could be implemented or affected by the determination of a process characteristic parameter within a process, and other possible uses of this value exist.

Moreover, as will be understood from the discussion provided above, the process characteristic parameter determination unit described herein, whether used as part of a simulation system or not, may be implemented in various different manners. For an off-line simulation application where simulation and control operate on different platforms (or computer systems), the process characteristic parameter determination unit with automatic tuning will typically need to utilize historical data. Otherwise massive amounts of live or raw data would need to be communicated to the simulation system which may entail developing dedicated communication software and data links. By utilizing the data from historical data file as the actual data, the simulation and process characteristic parameter determination calculations can proceed in a straightforward manner as described herein. On the other hand, for on-line simulation applications where simulation and control operate on the same platform (usually a DCS control system), the data required for tuning can be directly read from the DCS highway by the simulation or process characteristic parameter determination unit. The resulting value of the determined process characteristic parameter may then be continuously written to the simulation model in real-time.

Still further, in on-line simulations of heat exchanger models that adapt the heat transfer coefficient of the model, the determined heat transfer coefficient can be used for intelligent soot-blowing purposes or other maintenance purposes. In particular, by continuously monitoring and adjusting the heat transfer coefficient in the proposed manner, the fouling condition of a heat transfer area can be detected in real-time. A higher value of a heat transfer coefficient will correspond to a cleaner boiler section, and vice versa. As a result, this system may be used to implement an intelligent soot-blowing (ISB) application as the continuous heat transfer coefficient calculation can be utilized to advise or recommend soot-blowing operations. This approach can be used in lieu of other known heat-balance based first-principle "cleanliness factor" calculation methods or empirical data-driven "cleanliness factor" calculation methods.

More particularly, in a real-time simulation application used on, for example a boiler based power plant, this method allows the heat transfer coefficient to be determined automatically and continuously according to the ever changing run-time boiler conditions, and no other manual tuning or special data link, or third party software item is generally needed. In this case, it may be desirable to perform soot-blowing operations based on the determined heat transfer coefficient of a heat exchanger either manually or automatically. For example, when the determined heat transfer coefficient (or other process characteristic parameter or energy transfer characteristic parameter) falls below a predetermined threshold, the system or application receiving the heat transfer coefficient and performing the comparison may set an alarm or an alert to be displayed to the user, indicating that a soot-blowing operation needs to be performed. Alternatively, the system or application may automatically initiate a soot-blowing operation on the heat exchanger in response to the comparison. In this manner, soot-blowing is performed more effectively, as this method helps to assure that soot-blowing operations are performed when needed, but reduces the number of unnecessary soot-blowing operations as this method limits or prevents the initiation of soot-blowing operations when the heat transfer coefficient of the heat exchanger is still within an acceptable range.

In one case, it may be desirable to limit the automatic initiation of the soot-blowing operations or the generation of an alarm, an alert or other notification to a user to comparisons made between the heat transfer coefficient and the threshold made when the difference signal is at or near zero (i.e., within a predetermined threshold around zero, which threshold may be, for example, user selectable). That is, the system or application performing the soot-blowing decision may also receive the value of the difference signal and determine when the magnitude of the difference signal is below a threshold (i.e., near zero) or may receive an indication when magnitude of the difference signal is below a threshold (i.e., near zero) generated by the simulation module implementing the difference unit (412 or 512 for example of FIGS. 4 and 5, respectively) and the receiving system or application may operate to only initiate manual or automatic soot-blowing operations when the difference signal is near zero. This check prevents soot-blowing initiations when the tuning and simulation system is not yet tuned (and thus the heat transfer coefficient may still be incorrect).

Moreover, the design mechanism and calculation techniques described herein are not limited to heat transfer coefficient (which is a type of energy transfer coefficient) modeling and auto-tuning. These mechanisms and techniques can be useful for other applications as well. For example, these methods can be used to automatically calibrate fuel heating values (which is also an energy transfer coefficient) used in a simulation model that relies on this heating value (or BTU content) to calculate combustion temperature and/or the amount of power generation. In this case, the equivalent control input can be the fuel flow, and the equivalent process/model output (the variable to be matched) can be selected as the flue gas temperature or the generated power. However, this use is but one other example of how these techniques can be used to determine process characteristic parameters, and many other uses are possible.

While the process characteristic parameter determination and/or simulation systems described herein can be used in any desired type of plant to simulate, for example, material flow through the plant (liquids, gases or even solids), one example distributed simulation system is described herein as being used to simulate a power generation plant being controlled using distributed control techniques. However, the process characteristic parameter determination and simulation techniques described herein can be used in other types of plants and control systems, including industrial manufacturing and processing plants, water and waste water treatment plants, etc. and can be used with control systems implemented centrally or as distributed control systems.

When implemented in software, any of the process characteristic parameter determination software, simulation software and/or simulation modules described herein may be stored in any computer readable memory such as on a magnetic disk, a laser disk, or other storage medium, in a RAM or ROM of a computer or processor, etc. Likewise, this software or these modules may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A system for operating a process plant by determining a process characteristic parameter of the process plant, the system comprising:
   one or more processors;
   one or more program memories communicatively connected to the one or more processors and storing executable instructions that, when executed by the one or more processors, cause the one or more processors to implement a plurality of units, comprising:
   a process control unit configured to generate a process control signal to control at least a portion of a controlled process within the process plant;
   a process model unit configured to receive a set of process inputs related to the portion of the controlled process and to generate a predicted value of a process variable related to the portion of the controlled process using a process model that models the portion of the controlled process based on (i) the set of process inputs and (ii) a value of the process characteristic parameter, which process characteristic parameter is a parameter within the process model that corresponds to a process characteristic of the portion of the controlled process that is not directly measured, wherein the process characteristic is a property of the portion of the controlled process or a property of process equipment of the portion of the controlled process;
   a difference unit configured to generate a difference signal indicating a difference between a first input indicating a process variable value for the process variable and a second input indicating the predicted value of the process variable, wherein the first input receives the process variable value for the process variable of the controlled process as measured or determined (i) by a component within the controlled process or (ii) by the process control unit, and wherein the second input receives the predicted value of the process variable as generated by the process model unit; and
   a tuner unit configured to receive the difference signal from the difference unit, to determine a change to the value of the process characteristic parameter within the process model by evaluating the received difference signal using a tuner logic, and to automatically adjust the value of the process characteristic parameter within the process model based on the determined change,
   wherein the adjusted value of the process characteristic parameter is used to determine and implement a control action to control the process plant.

2. The system of claim 1, wherein the tuner logic includes a predetermined set of rules or routine to drive the difference signal towards zero.

3. The system of claim 1, wherein the process model is a first principle-based model of the controlled process.

4. The system of claim 1, wherein process model is an empirical model of the controlled process.

5. The system of claim 1, wherein the tuner unit includes a feedback control logic to determine a manner in which to change the value of the process characteristic parameter within the process model.

6. The system of claim 1, wherein the process model unit includes a simulated process controller having control logic to produce a simulated control signal value as the predicted value of the process variable, wherein the process model produces a predicted value of a further process variable and wherein the simulated process controller has a first input to receive a set point and a second input to receive the predicted value of the further process variable from the process model and wherein the simulated process controller uses the control logic to develop the simulated control signal value as the predicted value of the process variable based on the set point and the predicted value of the further process variable.

7. The system of claim 6, wherein the further process variable is a controlled process variable within the controlled process and wherein the simulated process controller receives the predicted value of the further process variable as a controlled variable feedback signal, and receives the set point as a set point for the further process variable from the controlled process.

8. The system of claim 6, wherein the difference unit receives the simulated process control signal as the predicted value of the process variable at the second input and receives the process control signal from the process control unit as the process variable value at the first input.

9. The system of claim 1, wherein difference unit is a summer that subtracts a first one of the first and second inputs from a second one of the first and second inputs to create the difference signal.

10. The system of claim 1, wherein the process variable is an uncontrolled variable within the controlled process, and wherein the process model unit produces the predicted value of the process variable as a predicted value of the uncontrolled variable.

11. The system of claim 1, wherein the process variable is process control signal within the controlled process, and wherein the process model unit produces the predicted value of the process variable as a predicted value of the process control signal.

12. A method of operating a process plant by simulating a process including a process characteristic parameter of the process plant, comprising:
   generating, by one or more processors, a process control signal to control at least a portion of a controlled process within the process plant;
   simulating, by the one or more processors, the process to produce a predicted value of a process variable of the controlled process of the process plant using a process model unit to receive a set of process inputs related to the portion of the controlled process and to generate the predicted value of the process variable using a process model that models the portion of the controlled process based on (i) the set of process inputs and (ii) a value of the process characteristic parameter, which process characteristic parameter is a parameter within the process model that corresponds to a process characteristic of the portion of the controlled process that is not directly measured, wherein the process characteristic is a property of the portion of the controlled process or a property of process equipment of the portion of the controlled process;
   obtaining, by the one or more processors, an actual value of the process variable from the controlled process as (i) a measurement or determination by a component within the controlled process or (ii) the generated process control signal;

determining, by the one or more processors, a difference signal indicating a difference between the actual value of the process variable and the predicted value of the process variable produced by the process model unit;

determining, by the one or more processors, a change to the value of the process characteristic parameter within the process model by evaluating the difference signal using a tuner logic;

automatically adjusting, by the one or more processors, the value of the process characteristic parameter of the process model based on the determined change to drive the difference signal towards zero;

determining, by the one or more processors, a control action to control the process plant; and implementing, by the one or more processors, the determined control action.

13. The method of operating a process plant according to claim 12, wherein simulating the controlled process to produce the predicted value of the process variable includes using the process model to produce a predicted value of an uncontrolled process variable within the controlled process as the predicted value of the process variable and wherein obtaining an actual value of the process variable from the controlled process includes obtaining a measured value of the uncontrolled process variable in the controlled process.

14. The method of operating a process plant according to claim 12, wherein simulating the controlled process to produce the predicted value of the process variable includes using the process model to produce a predicted value of a controlled process variable within the controlled process, and simulating the control system of the controlled process using the predicted value of the controlled process variable to produce a simulated control signal value as the predicted value of the process variable and wherein obtaining an actual value of the process variable from the controlled process includes obtaining a value of the process control signal developed to control the controlled process variable from a process controller within the controlled process.

15. The method of operating a process plant according to claim 14, further including obtaining, by the one or more processors, a value of a set point used by the process controller within the controlled process and wherein simulating the control system of the controlled process includes using the set point value and the predicted value of the controlled process variable to produce the simulated control signal value as the predicted value of the process variable.

16. The method of operating a process plant according to claim 15, further including using a same control logic in the simulated process controller that is equivalent to control logic used in the process controller within the controlled process.

17. The method of operating a process plant according to claim 12, wherein adjusting the value of the process characteristic parameter of the process model includes using a feedback control routing to determine a manner in which to adjust the value of the process characteristic parameter of the process model based on the difference signal.

18. The method of operating a process plant according to claim 12, wherein simulating the controlled process to produce the predicted value of the process variable using the process model includes using a first principle-based model of the controlled process within the process model.

19. The method of operating a process plant according to claim 12, wherein simulating the controlled process to produce the predicted value of the process variable using the process model includes using an empirical-based model of the controlled process within the process model.

20. The method of operating a process plant according to claim 12, wherein simulating the controlled process includes producing a predicted value of an uncontrolled process variable as the predicted value of the process variable.

21. The method of operating a process plant according to claim 12, wherein simulating the controlled process includes producing a simulated value of the process control signal as the predicted value of the process variable.

22. The method of operating a process plant according to claim 12, wherein the process characteristic parameter is a heat transfer coefficient of a heat exchanger.

23. The method of operating a process plant according to claim 12, further including performing the steps of simulating the controlled process to produce the predicted value of the process variable, obtaining the actual value of the process variable from the controlled process, determining the difference signal indicating the difference between the actual value of the process variable and the predicted value of the process variable and adjusting the value of the process characteristic parameter of the process model in real-time while the controlled process is operating.

24. The method of operating a process plant according to claim 12, further including performing the steps of simulating the operation of the controlled process to produce the predicted value of the process variable, obtaining the actual value of the process variable from the controlled process, determining the difference signal indicating the difference between the actual value of the process variable and the predicted value of the process variable and adjusting the value of the process characteristic parameter of the process model based on process data stored in a database.

25. A non-transitory computer readable medium storing instructions for simulating a controlled process of a process plant that, when executed by at least one processor of a computer system, cause the computer system to execute a plurality of simulation modules, each of the simulation modules being communicatively connected to one or more other simulation modules of the plurality of simulation modules, wherein each of the simulation modules includes a process model that performs modeling of a different portion of the controlled process, wherein one of the simulation modules includes:

a process model unit configured to receive a set of process inputs related to the respective portion of the controlled process and to generate a predicted value of a process variable related to the portion of the controlled process using a process model based on (i) the set of process inputs and (ii) a value of a process characteristic parameter, which process characteristic parameter is a parameter within the process model that corresponds to a process characteristic of the portion of the controlled process that is not directly measured, wherein the process characteristic is a property of the portion of the controlled process or a property of process equipment of the portion of the controlled process;

a difference unit configured to generate a difference signal indicating a difference between a first input indicating a process variable value for the process variable and a second input indicating the predicted value of the process variable, wherein the first input receives the process variable value for the process variable of the controlled process as measured or determined within the controlled process and wherein the second input receives the predicted value of the process variable as generated by the process model unit; and a tuner unit configured to receive the difference signal from the difference unit, to determine a change to the value of the process characteristic parameter within the process model by evaluating the received difference signal using a tuner logic, and to automatically adjust the value of the process characteristic parameter within the process model based on the determined change;

wherein the one of the simulation modules operates to communicate an output of the process model unit as an input to another one of the simulation modules; and wherein the value of the process characteristic parameter is used to determine a control action implemented to control the process plant.

26. The non-transitory computer readable medium of claim 25, wherein the process model is a first principle-based model of the particular portion of the controlled process.

27. The non-transitory computer readable medium of claim 25, wherein the process model unit includes a simulated process controller having control logic to produce a simulated control signal value as the predicted value of the process variable, wherein the process model is configured to produce a predicted value of a further process variable and wherein the simulated process controller has a first input to receive a set point and a second input to receive the predicted value of the further process variable from the process model.

28. The non-transitory computer readable medium of claim 27, wherein the further process variable is a controlled process variable within the controlled process and wherein the simulated process controller is configured to receive the predicted value of the further process variable as a controlled variable feedback signal, and receives the set point as a set point for the further process variable from the controlled process.

29. The non-transitory computer readable medium of claim 28, wherein the difference unit is configured to receive the simulated process control signal value as the predicted value of the process variable at the second input and is configured to receive a control signal value from a process controller within the controlled process as the process variable value at the first input.

30. The non-transitory computer readable medium of claim 25, wherein the process variable is an uncontrolled variable within the controlled process, and wherein the process model unit is configured to produce the predicted value of the process variable as a predicted value of the uncontrolled variable.

31. The non-transitory computer readable medium of claim 25, wherein tuner unit includes a feedback control logic to determine a manner in which to change the value of the process characteristic parameter within the process model.

32. The non-transitory computer readable medium of claim 25, wherein the process variable is a process control signal within the controlled process, and wherein the process model unit is configured to produce the predicted value of the process variable as a predicted value of the process control signal.

33. The non-transitory computer readable medium of claim 25, wherein the plurality of simulation modules are stored in and executed in separate computer devices connected by one or more communication channels.

34. The non-transitory computer readable medium of claim 25, wherein the plurality of simulation modules operate on-line during operation of the process.

35. The non-transitory computer readable medium of claim 25, wherein the one of the simulation modules is stored in a device associated with controlling equipment associated with the particular portion of the controlled process.

36. The non-transitory computer readable medium of claim 25, further including a data historian that stores process data generated in the controlled process, wherein at least one of the plurality of simulation modules are communicatively coupled to the data historian to receive the process data for the process variable to operate off-line with respect to operation of the controlled process.

* * * * *